United States Patent
Trowbridge et al.

(10) Patent No.: US 10,086,888 B2
(45) Date of Patent: Oct. 2, 2018

(54) HEAVY EQUIPMENT TRAILER WITH ADJUSTABLE DECK

(71) Applicant: Harley Murray, Inc., Stockton, CA (US)

(72) Inventors: David Lee Trowbridge, Wilton, CA (US); Douglas Glen Murray, Lodi, CA (US)

(73) Assignee: Harley Murray, Inc., Stockton, CA (US)

( * ) Notice: Subject to any disclaimer, the term of this patent is extended or adjusted under 35 U.S.C. 154(b) by 564 days.

(21) Appl. No.: 14/736,569

(22) Filed: Jun. 11, 2015

(65) Prior Publication Data

US 2016/0362146 A1 Dec. 15, 2016

(51) Int. Cl.
B62D 53/06 (2006.01)

(52) U.S. Cl.
CPC .................. B62D 53/062 (2013.01)

(58) Field of Classification Search
CPC .. B62D 53/062; B62D 53/061; B62D 53/064; B62D 53/065; B62D 53/0821
USPC ...................................... 280/441.2
See application file for complete search history.

(56) References Cited

U.S. PATENT DOCUMENTS

| | | | | |
|---|---|---|---|---|
| 1,117,966 A * | 11/1914 | Blaisdell | ............ | B62D 53/0814 280/438.1 |
| 2,116,412 A * | 5/1938 | Reid | .................... | B62D 53/061 280/418 |
| 2,772,008 A * | 11/1956 | Martin | ................. | B62D 53/065 414/481 |
| 2,772,892 A * | 12/1956 | Hake | .................... | B62D 53/061 280/2 |
| 2,894,764 A * | 7/1959 | Ronk | .................... | B62D 49/005 280/425.2 |
| 2,895,746 A * | 7/1959 | Swaney | ............... | B62D 53/065 254/420 |
| 2,919,928 A * | 1/1960 | Hoffer | .................. | B62D 53/061 280/423.1 |
| 3,326,572 A | 6/1967 | Murray | | |
| 3,419,169 A * | 12/1968 | James | .................. | B62D 53/065 280/441.2 |
| 3,429,585 A * | 2/1969 | Ross | ..................... | B62D 53/065 280/43.23 |
| 3,438,652 A * | 4/1969 | Hoffacker | ................. | B60P 3/40 280/2 |
| 3,819,076 A * | 6/1974 | Oehler | .................. | B60P 1/6427 280/421 |

(Continued)

*Primary Examiner* — Joseph M Rocca
*Assistant Examiner* — Conan D Duda
(74) *Attorney, Agent, or Firm* — Edward S. Wright

(57) ABSTRACT

Heavy equipment trailer comprising an elongated deck, a front gooseneck extending from the front of the deck for connection to a pulling vehicle, a rear gooseneck extending from the rear of the deck, a jeep with ground engaging wheels positioned to the rear of the deck, and an elevator operatively connected between the rear gooseneck and the jeep for raising and lowering the rear gooseneck to adjust the height of the deck above the ground. The trailer also has a front jeep and a rear booster with dual axles and multiple wheels, with the loads at the front and rear of the deck being distributed respectively between the front jeep and the pulling vehicle and between the rear jeep and the booster. A front jeep includes a lift for raising and lowering the front gooseneck and the front end of the deck.

21 Claims, 7 Drawing Sheets

(56) References Cited

U.S. PATENT DOCUMENTS

| | | | | |
|---|---|---|---|---|
| 4,051,968 A * | 10/1977 | Massey | B60P 1/6454 | 280/149.2 |
| 4,060,145 A * | 11/1977 | Kingman | B60G 5/04 | 280/423.1 |
| 4,070,033 A * | 1/1978 | Weir | B62D 53/0864 | 280/407 |
| 4,164,297 A * | 8/1979 | Dorwin | B62D 53/065 | 280/441.2 |
| 4,262,923 A * | 4/1981 | Weir | B62D 53/068 | 280/404 |
| 4,375,892 A * | 3/1983 | Jenkins | B62D 53/064 | 166/79.1 |
| 4,423,884 A * | 1/1984 | Gevers | B62D 53/067 | 280/407.1 |
| 4,423,885 A * | 1/1984 | Camey | B62D 53/065 | 280/441.2 |
| 4,513,987 A * | 4/1985 | Whitaker | B62D 53/065 | 280/441.2 |
| 4,741,549 A * | 5/1988 | Gevers | B62D 53/005 | 280/407.1 |
| 4,762,192 A * | 8/1988 | Maxwell | B60P 3/40 | 180/14.2 |
| 4,943,078 A * | 7/1990 | McGhie | B60G 21/06 | 280/405.1 |
| 5,005,851 A * | 4/1991 | McGhie | B60G 11/28 | 280/407.1 |
| 5,040,815 A * | 8/1991 | Evans | B62D 53/065 | 280/425.2 |
| 5,067,741 A * | 11/1991 | Ayme | B62D 53/061 | 280/419 |
| 5,370,414 A * | 12/1994 | Tucker | B62D 53/061 | 280/404 |
| 5,415,425 A * | 5/1995 | Zerbe | B62D 53/065 | 280/417.1 |
| 5,797,615 A * | 8/1998 | Murray | B62D 53/061 | 280/407.1 |
| 6,224,082 B1 * | 5/2001 | Landoll | B62D 53/065 | 280/425.2 |
| 6,371,505 B1 * | 4/2002 | Turner, II | B60P 3/00 | 280/404 |
| 6,378,887 B2 | 4/2002 | Landoll et al. | | |
| 6,641,161 B1 * | 11/2003 | McLelland | B60P 1/045 | 105/199.2 |
| 7,112,029 B1 * | 9/2006 | Neatherlin | B60P 3/40 | 280/404 |
| 7,637,512 B1 * | 12/2009 | McGhie | B60P 1/54 | 280/404 |
| 8,752,854 B2 | 6/2014 | Trowbridge et al. | | |
| 9,663,015 B2 * | 5/2017 | Kortesalmi | B62D 53/04 | |
| 2001/0011807 A1 * | 8/2001 | Landoll | B62D 53/065 | 280/491.3 |
| 2002/0145267 A1 * | 10/2002 | Boon | B62D 53/062 | 280/441.2 |
| 2004/0135344 A1 * | 7/2004 | Douglas | B02C 21/02 | 280/404 |
| 2004/0150188 A1 * | 8/2004 | Smith | B62D 53/065 | 280/441.2 |
| 2009/0223095 A1 * | 9/2009 | Klein | B60D 1/065 | 37/412 |
| 2011/0074132 A1 * | 3/2011 | Banwart | B61D 3/187 | 280/476.1 |
| 2012/0056407 A1 * | 3/2012 | Trowbridge | B62D 53/062 | 280/441.2 |
| 2012/0148362 A1 * | 6/2012 | Lawlor | B60P 3/062 | 410/44 |
| 2014/0015223 A1 * | 1/2014 | Banwart | B62D 53/0842 | 280/476.1 |
| 2015/0054256 A1 * | 2/2015 | Graham | B62D 53/061 | 280/441.2 |

* cited by examiner

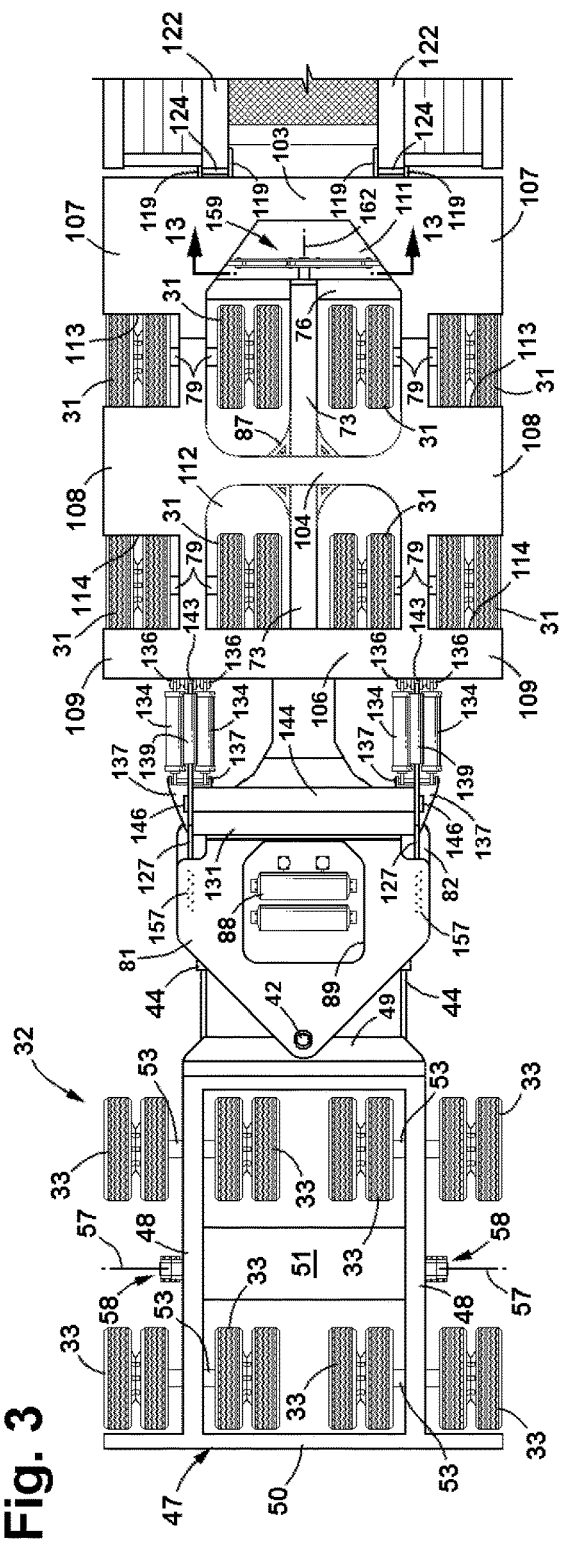
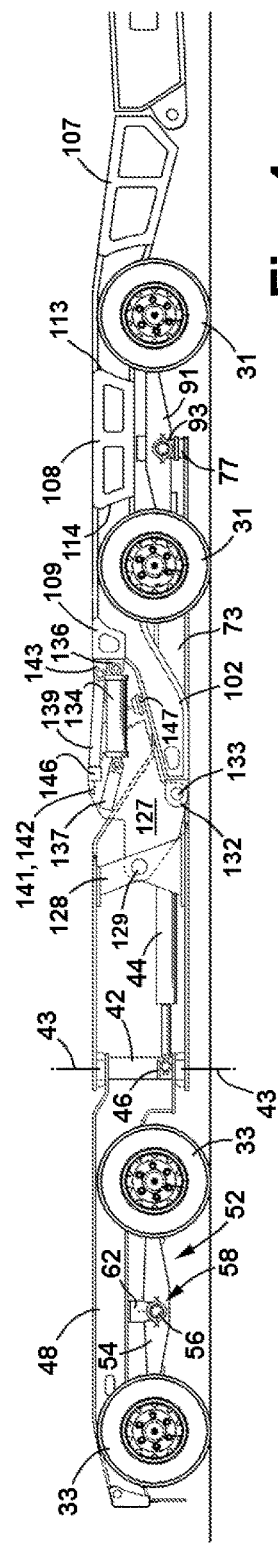
Fig. 3
Fig. 4

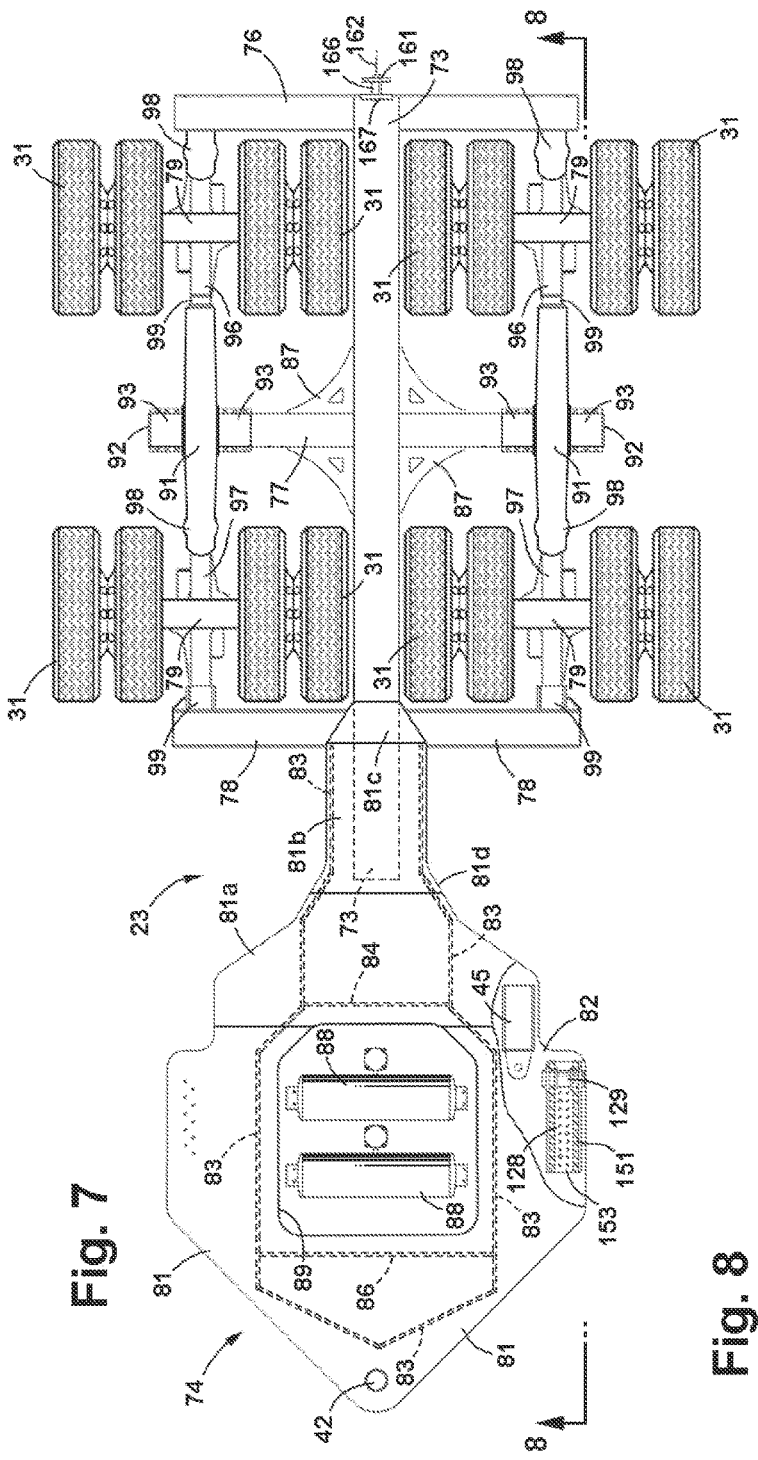
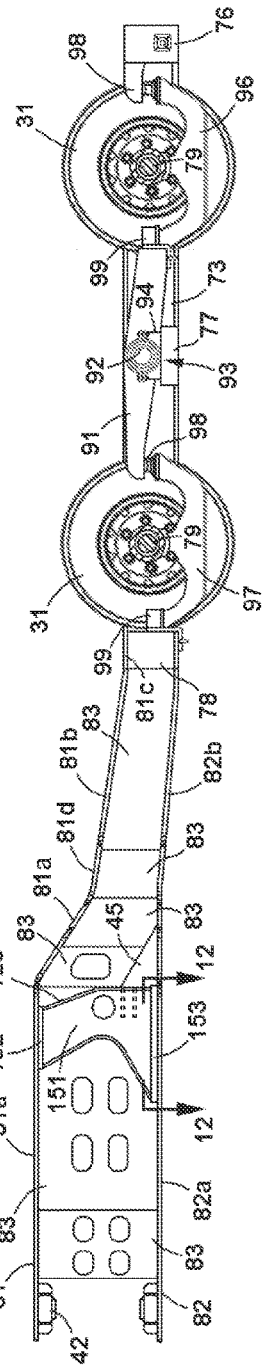
Fig. 7
Fig. 8

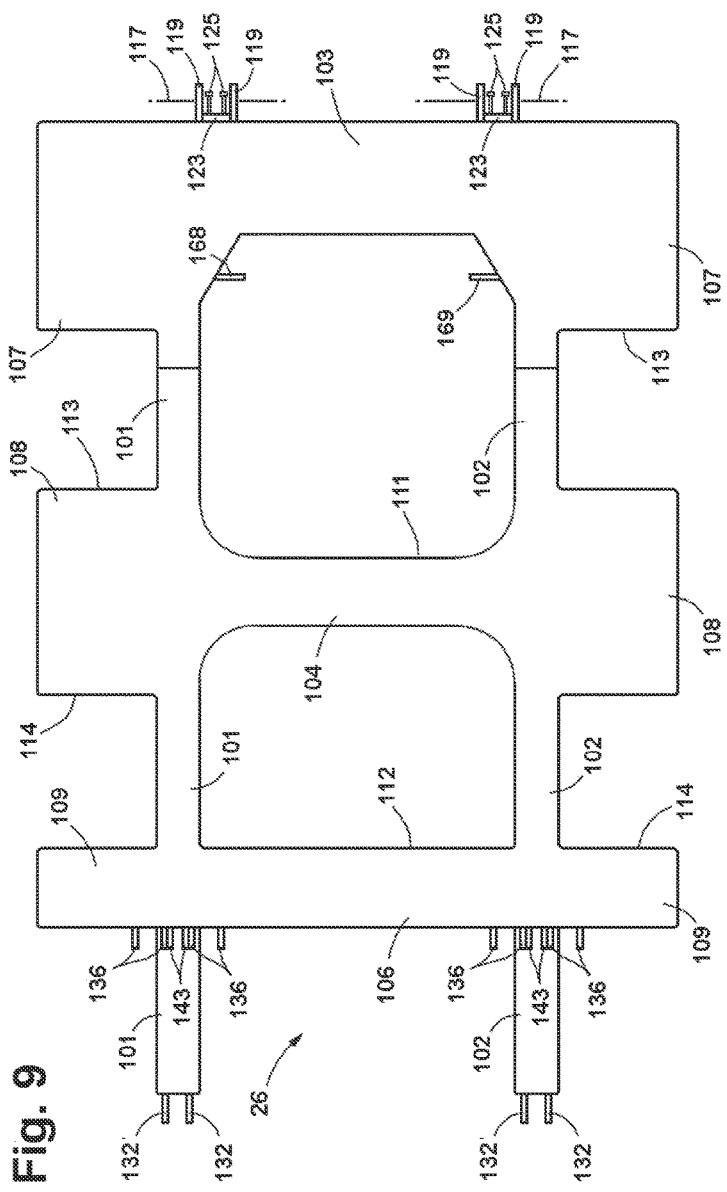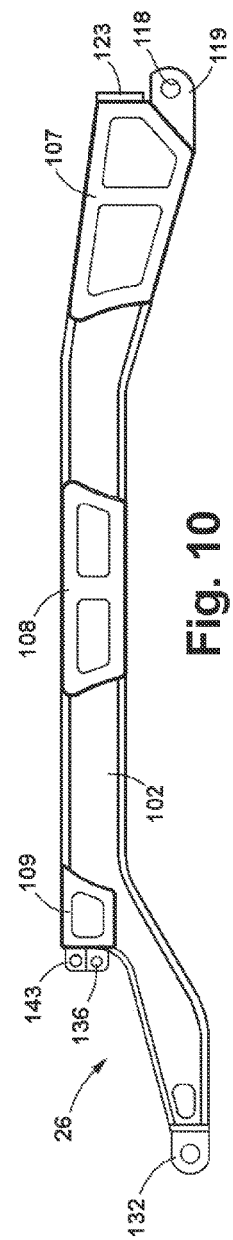

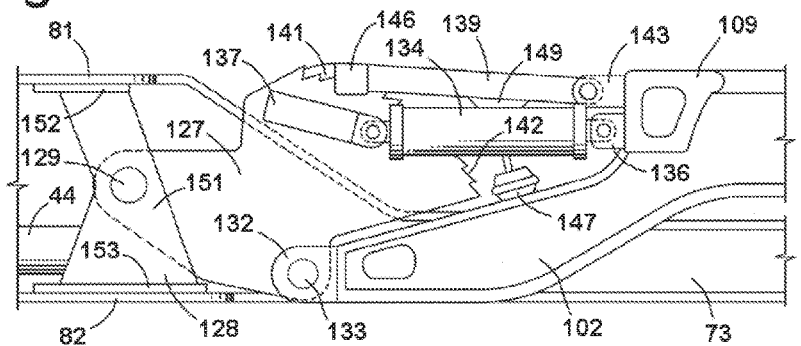
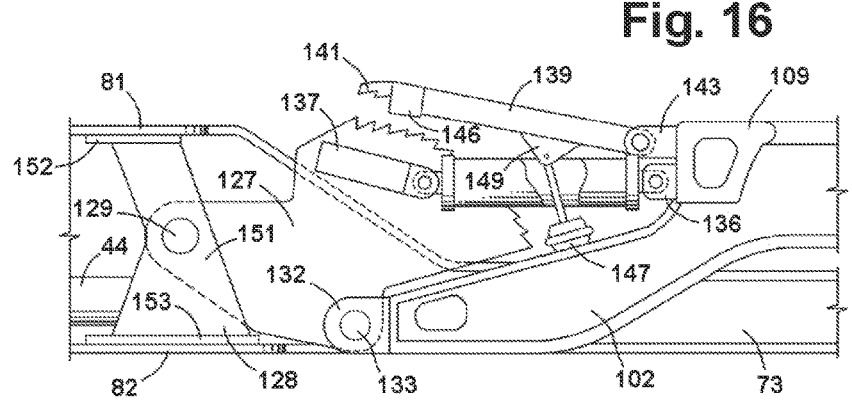
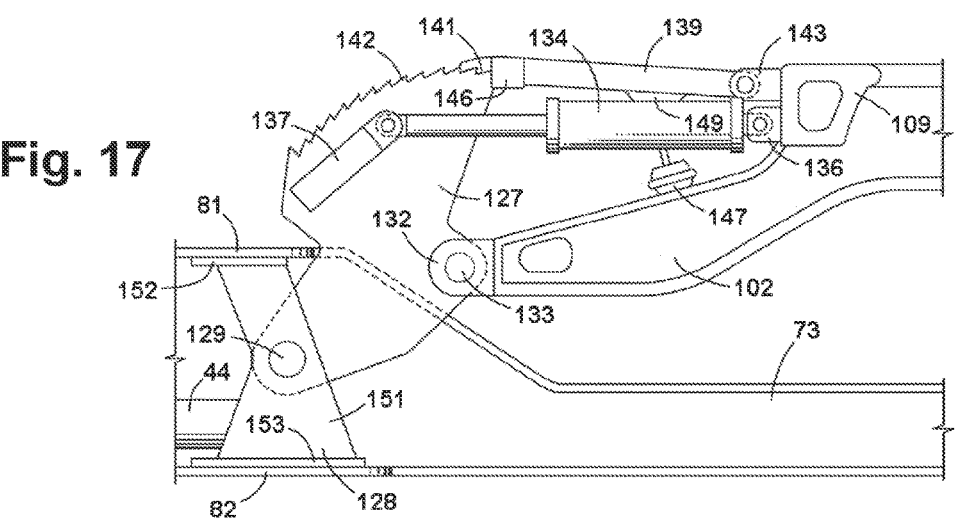

HEAVY EQUIPMENT TRAILER WITH ADJUSTABLE DECK

BACKGROUND OF THE INVENTION

Field of Invention

This invention pertains generally to trailers for hauling heavy equipment and other large, heavy loads and, more particularly to a heavy equipment trailer with an adjustable deck.

Related Art

Trailers for transporting construction equipment and other large, heavy loads (referred to herein generically as heavy equipment trailers) typically have elongated decks supported toward the rear by ground engaging wheels, with means toward the fronts of the decks for connecting the trailers to tractors or other pulling vehicles. The connection is commonly made with a gooseneck which can be detached from the deck to allow the equipment to be loaded onto the deck from the front. The gooseneck can either be a rigid structure that must be raised and lowered manually, or it can have a hydraulically operated lifting mechanism built into it. Examples of trailers with rigid and hydraulically operated gooseneck assemblies are found in U.S. Pat. Nos. 3,326,572 and 6,378,887.

When the front end of the deck is raised and lowered with a hydraulically operated gooseneck, the deck pivots about the wheels at the rear and is tilted at an angle that corresponds to the height to which the front end is lifted. With the axis of tilt beneath the rear portion of the deck, the rear portion remains at a substantially constant height throughout the range of lift, and there can be only one height at which the deck is in a level running position.

OBJECTS AND SUMMARY OF THE INVENTION

It is, in general, an object of the invention to provide a new and improved trailer for hauling construction equipment and other heavy loads.

Another object of the invention is to provide a trailer of the above character with an adjustable deck.

These and other objects are achieved in accordance with the invention by providing a heavy equipment trailer comprising an elongated deck, a front gooseneck extending from the front of the deck for connection to a pulling vehicle, a rear gooseneck extending from the rear of the deck, a jeep with ground engaging wheels positioned to the rear of the deck, and an elevator operatively connected between the rear gooseneck and the jeep for raising and lowering the rear gooseneck to adjust the height of the deck above the ground.

In one disclosed embodiment, the elevator is rotatably connected to the jeep for rotation about a horizontally extending axis, the rear end of the rear gooseneck is pivotally connected to the elevator in a load supporting manner at a point spaced from the axis, and an actuator is operatively connected to the elevator for rotating the elevator about the axis to raise and lower the rear end of the gooseneck.

The trailer also has a front jeep and a rear booster with dual axles and multiple wheels, with the loads at the front and rear of the deck being distributed respectively between the front jeep and the pulling vehicle and between the rear jeep and the booster. A front jeep includes a lift for raising and lowering the front gooseneck and the front end of the deck.

BRIEF DESCRIPTION OF THE DRAWINGS

FIG. 3 is a fragmentary top plan view of the rear portion of the main deck, the rear gooseneck and jeep, and the rear booster of the trailer in the embodiment of FIG. 1.

FIG. 4 is a side elevational view of the portion of the trailer shown in FIG. 3.

FIG. 7 is a top plan view of the rear jeep of the trailer in the embodiment of FIG. 1.

FIG. 8 is a side elevational and cross-sectional view taken along line 8-8 in FIG. 7.

FIG. 9 is a top plan view of the rear gooseneck of the trailer in the embodiment of FIG. 1.

FIG. 10 is a side elevational view, partly broken away, of the rear gooseneck.

FIGS. 15-17 are enlarged, fragmentary, side elevational views of the rear lift mechanism or elevator of the trailer in the embodiment of FIG. 1 in different operating positions.

DETAILED DESCRIPTION

Figure 1:
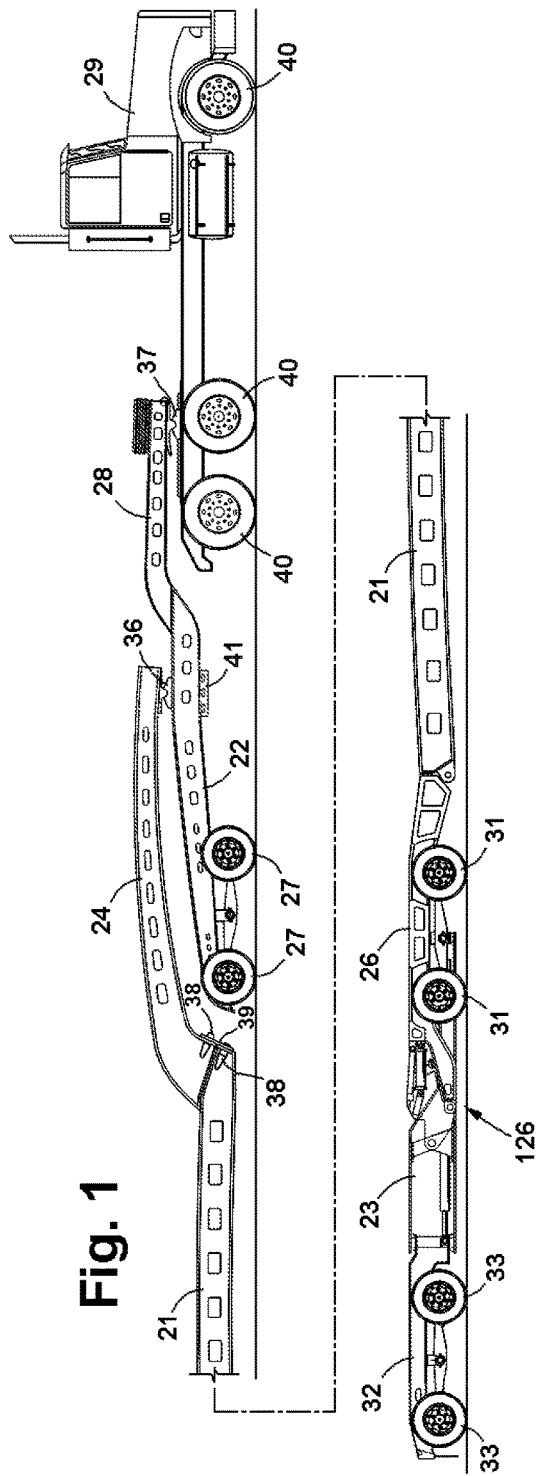
FIG. 1 is a side elevational view of one embodiment of a heavy equipment trailer incorporating the invention attached to a pulling vehicle, with the deck in a low running position.

As illustrated in FIG. 1, the trailer has an elongated main deck 21 which is suspended between front and rear jeeps 22, 23 by goosenecks 24, 26. Front jeep 22 has ground engaging wheels 27 toward the rear and a forwardly extending gooseneck 28 which connects to a pulling vehicle 29. Rear jeep 23 has ground engaging wheels 31 toward the front, with a booster 32 having additional ground engaging wheels 33 attached to its rear in load supporting relationship.

Front gooseneck 24 is connected to a fifth wheel 36 on front jeep 22, and gooseneck 28 is connected to a fifth wheel 37 on the pulling vehicle. Gooseneck 24 is also rigidly, but detachably, connected to the front end of deck 21 by coupling pins 38 and links 39 as described in detail in U.S. Pat. Nos. 3,326,572 and 8,752,854, the disclosures of which are incorporated herein by reference. The detachable connection allows the front end of the deck to be lowered to the ground when loading equipment onto and unloading equipment from the deck.

Gooseneck 24 is connected to jeep 22 at a point forward of wheels 27 so that the load or weight at the front of the deck is distributed between, or shared by, those wheels and the wheels 40 of the pulling vehicle. The distribution between the pulling vehicle and the jeep can be adjusted by moving fifth wheel 36 forward or back on the jeep, with a greater portion of the load being carried by the vehicle as the fifth wheel is moved forward. Distribution of the load between the front and rear wheels of the pulling vehicle can similarly be adjusted by moving fifth wheel 37 forward or back on the pulling vehicle.

Fifth wheel 36 is mounted on a lift mechanism or elevator 41 which can be raised and lowered by hydraulic cylinders or other suitable means (not shown) to raise and lower gooseneck 24 and thereby adjust the height the front end of deck 21 above the ground.

Rear gooseneck 26 is attached to the rear end of deck 21 and is connected to rear jeep 23 at a point to the rear of wheels 31 so that the load or weight at the rear of the deck is distributed between, or shared by, those wheels and the wheels 33 on booster 32. The distribution between the jeep and booster can be adjusted by moving the connection forward or back on the jeep, with a greater portion of the load being carried by the booster as the connection is moved back.

Booster 32 is pivotally connected to rear jeep 23 by a kingpin hitch 42 which permits the booster to rotate about a vertical steering axis 43 while maintaining a rigid load supporting connection between the booster and jeep. A steering mechanism is provided for turning the booster about the steering axis to actively steer the rear of the trailer, and in the embodiment illustrated, this mechanism comprises a pair of hydraulic cylinders 44 which are connected between the jeep and the booster on opposite sides thereof. The cylinders are pivotally connected to brackets 45, 46 on the jeep and the booster, and turning of the booster is effected by simultaneous extension of one cylinder and retraction of the other.

As best seen in FIGS. 3 and 4, booster 32 has a generally rectangular, peripheral frame 47 comprising a pair of longitudinally extending side members or beams 48, a front cross member 49, and a rear cross member 50. The cross members and beams are welded together to form a rigid, unitary structure, and a storage box 51 for equipment such as air tanks for the trailer's brake system extends laterally between the beams.

The booster has a 3-point suspension which includes longitudinally extending equalizers 52 and laterally extending axles 53 on which wheels 33 are mounted. The axles extend from both sides of the equalizers, and two wheels are mounted on each of the axles on each side of the equalizers. The axles on opposite sides of the booster are aligned with each other to form dual axles with eight wheels on each of the two axles.

Figure 6:
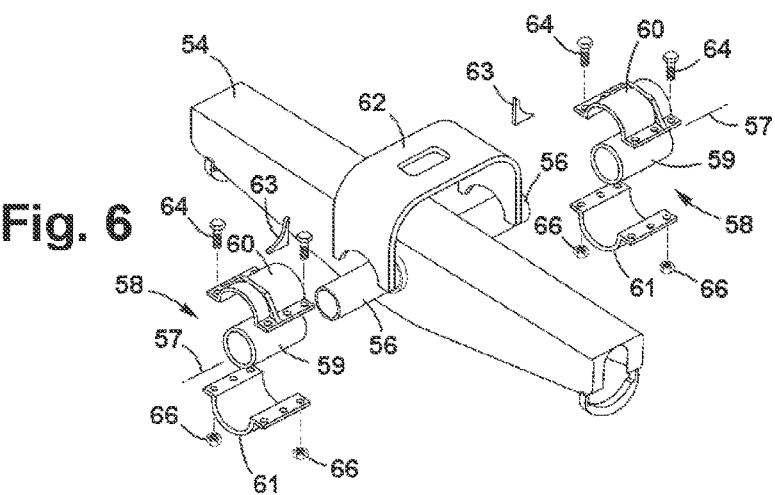
FIG. 6 is an exploded isometric view of an equalizer in the suspension of the trailer in the embodiment of FIG. 1.

As illustrated in FIG. 6, each of the equalizers includes an elongated beam 54, with short shafts or trunnions 56 extending laterally from opposite sides of the beam along a transverse horizontal axis 57. The trunnions are rotatably mounted in bearing assemblies 58 which include sleeve bearings 59 and bearing caps 60, 61. Upper bearing caps 60 are affixed to the depending arms of U-shaped mounting brackets 62 which are welded in an inverted position to the under sides of frame members 48. In the embodiment illustrated, the caps are welded to the bracket and reinforced by gusset plates 63. Lower caps 61 are secured to the upper caps by bolts 64 and nuts 66, with bearing sleeves 59 between the walls of the caps and the trunnions.

Axles 53 are attached to axle hangers 68 which extend longitudinally from the ends of equalizer beams 54 and are attached at their outer ends to frame members 48 by ball joints 69. The inner ends of the hangers are connected to the outer ends of the beams by sliding swivel joints 71 which permit rotational or pivotal movement about and sliding movement along the longitudinal axes of the beams. The axle housings are affixed to the middle portions of the hangers by suitable means such as welding.

Rear jeep 23 has a longitudinally extending central frame member or beam 73 with a generally hexagonally shaped body 74 toward the rear and cross members 76, 77, and 78 extending laterally from the beam in front of the body. Wheels 31 are mounted on laterally extending axles 79 which are aligned in pairs on opposite sides of the jeep to form dual axles with eight wheels each, as in the booster.

As best seen in FIGS. 7 and 8, the body has upper and lower panels or plates 81, 82 which have main sections 81a, 82a of generally hexagonal contour, with generally rectangular tongues 81b, 82b extending in a forward direction from the main sections. Approximately the rear three-fourths of upper main section 81a lies in a generally horizontal plane, and the remaining one-fourth is inclined downwardly and forwardly at an angle of approximately 57 degrees to the horizontal. The tongue extends from the front of the main section at an angle of approximately 8.5 degrees to the horizontal. The entire main section 82a of lower plate 82 lies in a substantially horizontal plane, and tongue 82b is inclined downwardly and forwardly at an angle of approximately 5 degrees to the horizontal. The front corners 81c, 82c of the tongues are beveled, as are the transitions 81d, 82d between the main sections and the tongues.

A side wall 83 extends vertically between the upper and lower panels of the body, and cross walls 84, 86 extend laterally between opposing sections of the side wall. The side wall follows the general contour of the panels and is spaced inwardly from their edges.

The rear portion of beam 73 extends between the tongues, and the side walls and the beam are affixed to the panels by suitable means, such as welding, to form a rigid, unitary structure. Cross members 76, 77, and 78 are likewise affixed to beam 73 by means such as welding, with gusset plates 87 providing additional support for middle cross member 77.

Air tanks 88 for the brake system are mounted on the upper side of lower plate 82 in a compartment bounded by opposite sections of side wall 83 and cross walls 84, 86. Access to the tanks is provided by an opening 89 in upper plate 81 above the compartment.

The suspension for the rear jeep is similar to that of the booster, with equalizer beams 91 pivotally mounted on the outer ends of middle cross member 77. These beams are similar to the equalizer beams 54 on the booster, with laterally extending trunnions 92 rotatably mounted in bearing assemblies 93 similar to bearing assemblies 58. Bearing assemblies 93 are attached to cross member 77 by U-shaped mounting brackets 94 which are similar to brackets 62 except they are mounted on the upper side of the cross member with the arms of the brackets facing up.

Axles 79 are attached to front and rear axle hangers 96, 97 which extend longitudinally from the ends of equalizer beams 91 and are attached at their outer ends to front cross member 76 and rear cross member 78, respectively. In the embodiment illustrated, the forward ends of the hangers are connected to front cross member 76 and to the rear ends of beams 91 by ball joints 98, and the rear ends of the hangers are connected to the front ends of the beams and to rear cross member 78 by sliding swivel joints 99. The axle housings are affixed to the middle sections of the axle hangers by suitable means such as welding.

Rear gooseneck 26 is a rigid, unitary structure which is positioned toward the front of rear jeep 23, in front of the body and above the wheels. As best seen in FIGS. 9 and 10, the rear gooseneck has a pair of longitudinally extending frame members or beams 101, 102, cross members or beams 103, 104, and 106 which extend laterally between the main beams, and islands 107, 108, and 109 which extend outwardly from the main beams on opposite sides of the structure in axial alignment with the cross members. The cross members, islands, and beams form a deck with a generally square opening 111 between beams 101, 102 and cross members 107, 108, a generally rectangular opening 112 between beams 101, 102 and cross members 108, 109, and gaps 113, 114 between the islands. The gaps are centered above the axles 79 on rear jeep 23, and the islands serve as partial fenders for the outer sets of wheels 39 on the jeep.

Figure 11:
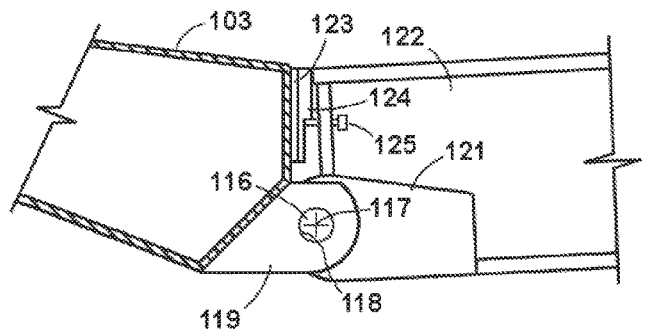
FIG. 11 is a fragmentary elevational view of the connection between the main deck and the rear gooseneck in the embodiment of FIG. 1.

The rear gooseneck is attached to main deck 21 in a manner which permits a limited degree of flexibility while providing a load supportive connection between the two. As best seen in FIG. 11, the gooseneck is pivotally connected to the deck by pins 116 which are aligned along a laterally extending horizontal axis 117. These pins pass through axially aligned bores 118 in flanges 119 which extend in a forward direction from the front cross member 103 of the gooseneck and in flanges 121 on opposite sides of longitudinally extending frame members or beams 122 at the rear of the deck. The spacing between the inner faces of flanges 119 is slightly greater than the spacing between the outer faces of flanges 121, and the pins are affixed by suitable means such as welding to flanges 119 and rotatively received in the bores in flanges 121.

Pads 123 are mounted on the front side of cross member 103 above the pins and in alignment with the upper portions of frame members 122, with interchangeable shims 124 between the frame members and pads to limit rotation and control the angle between the gooseneck and deck. The weight of the gooseneck and deck and any loads on them exert a downward force on front of the gooseneck and the rear of the deck, urging the ends of the frame members and the pads into abutting engagement with the shims to provide a rigid load supporting relationship in which the rear of the deck is suspended from and supported by the gooseneck, with the angle between the gooseneck and the deck being determined by the thickness of the shims. At the same time, the gooseneck and deck are free to pivot in the opposite direction and swing upwardly as may be required when the trailer travels across uneven terrain.

The shims are normally clamped firmly in place between the deck and the pads. They can be changed by lowering the rear gooseneck and limiting downward movement of the deck with blocks or other suitable means (not shown) so that the frame members and pads swing apart and release the shims. When released, the shims rest upon support pins 125 which extend from the pads and are received in vertically extending slots (not shown) which open through the lower edges of the shims. The shims can be lifted off the pins and replaced with other shims of different thickness. When the gooseneck is raised back to a normal running position, the frame members and blocks pivot back together, clamping the shims firmly between them.

Means is provided for raising and lowering rear gooseneck 26 relative to jeep 23 to adjust the height of deck 21 above ground. This means comprises a lift mechanism or elevator 126 which is connected between the gooseneck and jeep toward the rear of the gooseneck. The mechanism includes a pair of lift plates 127 which are rotatably connected to mounting brackets 128 on opposite sides of the jeep by pins 129 for rotation about a transversely extending horizontal axis. The two lift plates are connected rigidly together for movement in concert by a cross arm 131, as seen in FIG. 3. Flanges 132 extend from the rear ends of gooseneck beams 101, 102 on opposite sides of the lift plates and are rotatably connected to the lift plates by pins 133 which are spaced forwardly of the pins 129 that connect the plates to the jeep. Hydraulic operating cylinders 134 are pivotally connected to brackets 136, 137 on the rear cross member 106 of the gooseneck and the inner and outer faces of the lift plates. Extension and retraction of these cylinders cause the plates to rotate about the axis of pins 129, thereby raising and lowering pins 132 and the gooseneck.

Means is also provided for locking the elevator in a given position to maintain the deck at a desired height. This means comprises latch arms 139 with teeth 141 that engage matching teeth 142 on the upper edges of the lift plates. These edges are arcuately curved and centered about the axis of the pivot pins 133 that connect the gooseneck to the plates. The latch arms are pivotally connected at one end to brackets 143 on rear cross member 106 and are connected rigidly together for movement in concert by a cross arm 144. Guide flanges 146 which extend from the latch bars on the outer sides of the lift plates near teeth 141 cooperate with the cross arm to keep the arms centered above the plates. Hydraulic actuators 147 are connected between gooseneck frame members 102 and the latch arms for raising and lowering the free ends of the arms to bring teeth 141 into and out of engagement with the teeth on the lift plates. The bodies of the actuators are mounted on and affixed to the upper sides of the frame members, and the operating rods of the actuators are pivotally connected to brackets 149 on the under sides of the latch arms.

Figure 12:
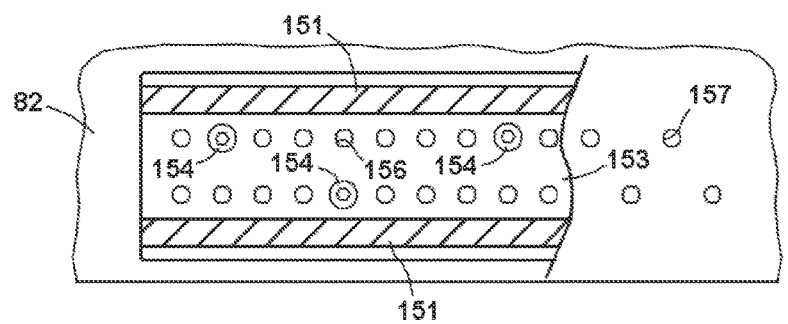
FIG. 12 is an enlarged, horizontal sectional view taken along line 12-12 in FIG. 8.

Mounting brackets 128 have spaced apart side plates 151 between which the lift plates 127 and pivot pins 129 extend. Flanges 152, 153 are affixed to the upper and lower ends of the side plates and are attached to the upper and lower deck plates or panels 81, 82 of the rear jeep by mounting bolts 154, as best seen in FIG. 12. The bolts pass through holes 156 in the flanges and are threadedly received in corresponding holes 157 in the deck plates. The holes are arranged in matrices or patterns which allow the brackets to be mounted in different positions on the jeep to adjust the distribution of weight between the wheels on the jeep and the booster. Once a desired distribution is achieved, the brackets can be welded to the deck plates for added strength and security, if desired.

Figure 13:
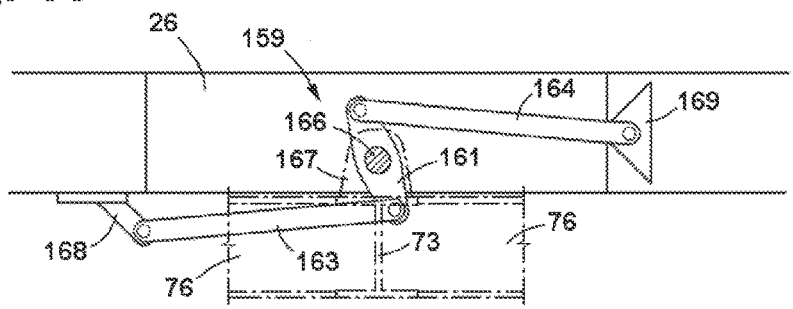
FIG. 13 is a fragmentary elevational view, taken along line 13-13 in FIG. 3, with the gooseneck and deck in a lowered position.
Figure 14:
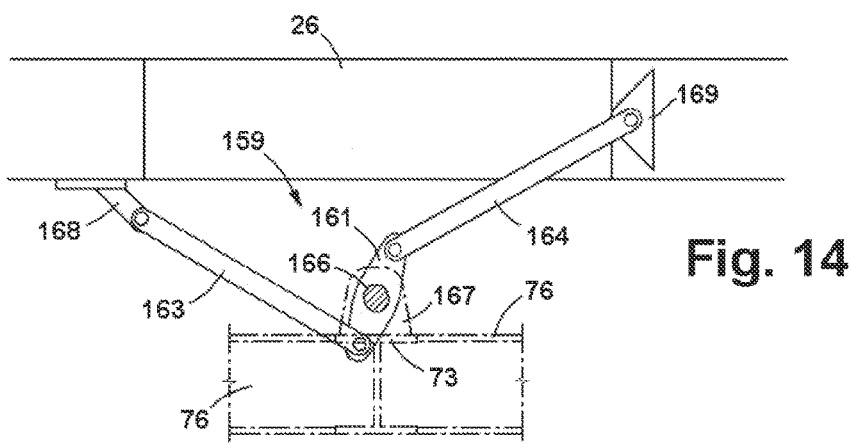
FIG. 14 is a view similar to FIG. 13, with the gooseneck and deck in a raised position.

A front steering mechanism 159 keeps the forward end of rear gooseneck 26 centered laterally of the rear jeep as the gooseneck is raised and lowered and the deck is at different heights. As best seen in FIGS. 13 and 14, this mechanism includes a crank 161 which is pivotally mounted on the jeep for rotation about a longitudinally extending axis 162 and a pair of control arms or links 163, 164 which are connected between opposite ends of the crank and opposite sides of the gooseneck. In the embodiment illustrated, the crank is rotatively mounted on a post 166 that is affixed to a block 167 attached to the forward end of frame member 73. Control arms or links 163, 164 are pivotally connected to the crank and to brackets 168, 169 which are affixed to the gooseneck on opposite sides of the axis. FIG. 13 shows the mechanism with the gooseneck in a lowered position, and FIG. 14 shows it with the gooseneck in a raised position. In these figures, frame members 73, 76 and mounting block 167 are shown in phantom lines since they are to the rear of the plane of view and not otherwise visible in these views.

Operation of the rear lift mechanism or elevator is illustrated in FIGS. 15-17. As described above and seen in these figures, lift plates 127 are rotatably mounted on pivot pins 129 affixed to mounting brackets 128 on rear jeep 23 toward the rear of the plates. In the fully lowered position shown in FIG. 15, operating cylinders 134 are fully retracted, and the latch plates are in their lowered or full clockwise position, as seen in this view. Pins 133 and the rear end portions of gooseneck frame members 101, 102 are also at their lowest positions, as is the rear portion of deck 21. Front lift mechanism or elevator 41 is likewise retracted in a down position to keep the front of the deck level with the rear.

Latch arm actuators 147 are also fully retracted, with the teeth 141 on latch arms 139 engaged with the teeth 142 on the lift plates to prevent rotation of the plates. The angles of the teeth are such that when the weight of the plates and the load exerted on them by the rear gooseneck urge the plates to rotate in the downward or clockwise direction, the teeth on the plates are pressed into locking engagement with the teeth on the arms so that the arms cannot be dislodged from the plates.

To change the position of the deck, operating cylinders 134 are extended to move the plates far enough in a counterclockwise direction to unlock the teeth, and actuators 147 are extended to swing the latch arms up, away from the plates, as seen in FIG. 16. With the teeth on the arms disengaged from the teeth on the plates, the plates are free to be rotated about pins 129 by the operating cylinders. As the cylinders are extended, the plates rotate in the counterclockwise direction, raising pins 133 and gooseneck 23, as shown in FIG. 17. When the rear of the deck 21 has reached the desired height, actuators 147 are retracted to bring the teeth on the latch arms back into engagement with the teeth on the plates, and operating cylinders 134 are relaxed to allow the teeth on the arms to sink into locking engagement with the teeth on the plates.

Figure 2:
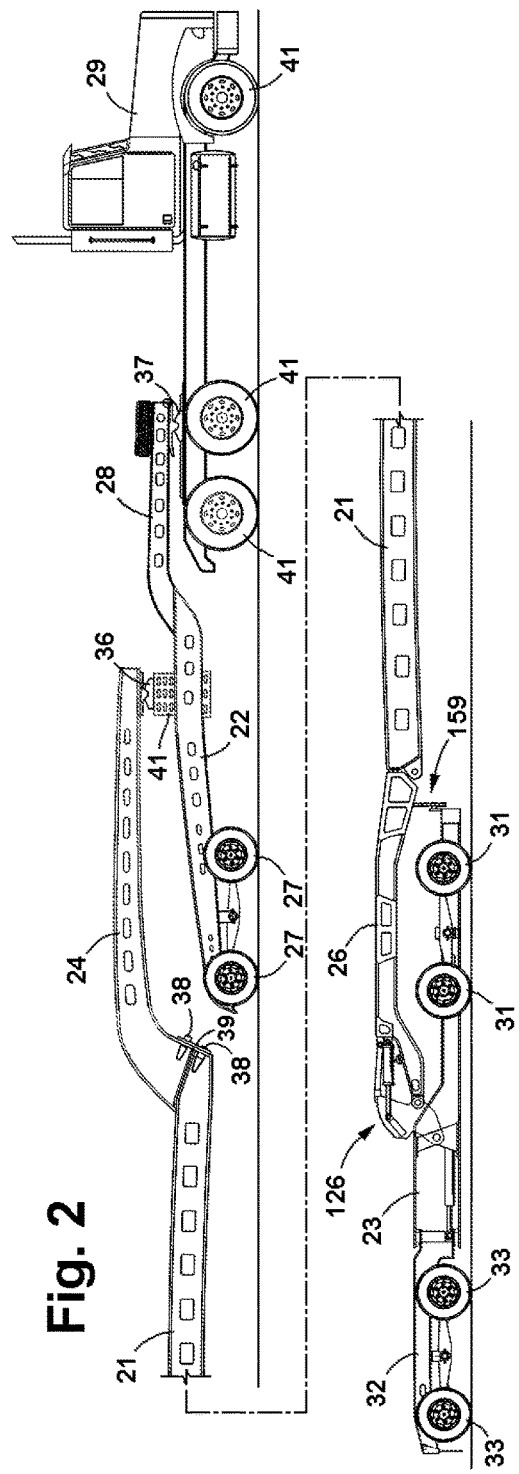
FIG. 2 is a view similar to FIG. 1, with the deck in a raised position.
Figure 5:
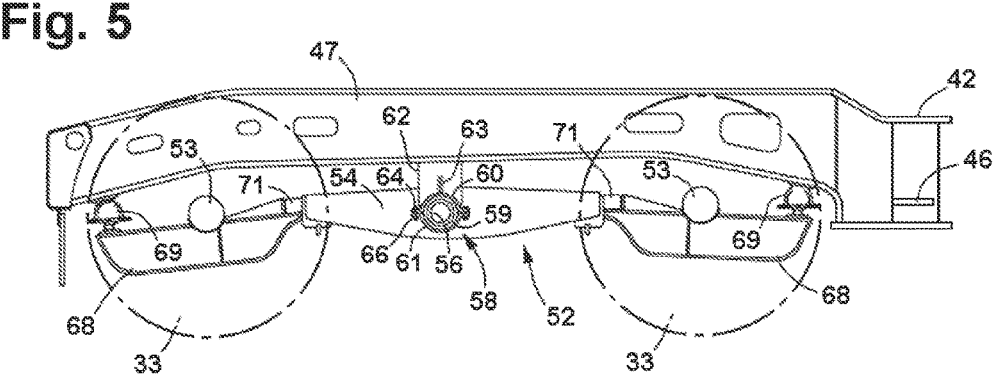
FIG. 5 is an enlarged side elevational view of the rear booster of the trailer in the embodiment of FIG. 1, with the wheels of the booster removed and shown in phantom lines.

FIG. 17 shows lift plates 127 fully raised and in their full counterclockwise position, with pins 133 and gooseneck 23 in their fully raised positions. To keep the deck level, front elevator 41 can also be raised, as shown in FIG. 2.

To lower the rear of the deck, latch teeth 141, 142 are disengaged, and operating cylinders 134 are retracted, turning lift plates 127 in the clockwise direction and lowering the rear ends of frame members 101, 102. If desired, front elevator 41 can also be lowered to lower the front of the deck and keep the deck level.

It is apparent from the foregoing that a new and improved trailer for hauling construction equipment and other heavy loads has been provided. While only certain presently preferred embodiments have been described in detail, as will be apparent to those familiar with the art, certain changes and modifications can be made without departing from the scope of the invention as defined by the following claims.

The invention claimed is:

1. A heavy equipment trailer, comprising: an elongated deck, a front gooseneck extending from the front of the deck for connection to a pulling vehicle, a rear gooseneck extending from the rear of the deck, a jeep with ground engaging wheels positioned to the rear of the deck, an elevator operatively connected between the rear gooseneck and the jeep for raising and lowering the rear gooseneck to adjust the height of the deck above the ground, a crank mounted on the jeep for rotation about a longitudinally extending axis, and control arms pivotally connected between opposite ends of the crank and the gooseneck for keeping the front end portion of the gooseneck centered laterally of the jeep as the gooseneck is raised and lowered.

2. The trailer of claim 1 wherein the elevator is rotatably connected to the jeep for rotation about a horizontally extending axis, and the rear end of the rear gooseneck is pivotally connected to the elevator in a load supporting manner at a point spaced from the axis, with an actuator operatively connected to the elevator for rotating the elevator about the axis to raise and lower the rear gooseneck and the deck.

3. The trailer of claim 2 wherein the actuator comprises an operating cylinder connected between the rear gooseneck and the elevator.

4. The trailer of claim 1 including means associated with the elevator for locking the deck at different heights above the ground.

5. The trailer of claim 4 wherein the elevator is rotatably connected to the jeep and pivotally connected to the rear gooseneck, and the means for locking the deck at different heights includes interlocking teeth on the elevator and on a latch arm which is movable relative to the elevator for bringing the teeth on the arm into and out of engagement with the teeth on the elevator to lock the elevator in different rotational positions corresponding to the different deck heights.

6. The trailer of claim 1 further comprising a front jeep with ground engaging wheels positioned in front of the deck for connection to the pulling vehicle, with the front gooseneck being connected to the front jeep in front of the wheels so that the load at the front of the deck is distributed between the front jeep and the pulling vehicle, and a booster with ground engaging wheels connected to the rear jeep in load supportive relationship, with the elevator being connected to the rear jeep behind the wheels on the rear jeep so that the load at the rear of the deck is distributed between the rear jeep and the booster.

7. The trailer of claim 6 wherein the jeeps and the booster each have dual axles with eight wheels on each of the axles.

8. The trailer of claim 6 wherein the booster is pivotally connected to the rear jeep for rotation about a vertical axis, and means is connected between the rear jeep and the booster for turning the booster about the axis to actively steer the rear of the trailer.

9. A heavy equipment trailer, comprising: an elongated deck, a front gooseneck extending from the front of the deck for connection to a pulling vehicle, a rear gooseneck extending from the rear of the deck, a jeep with ground engaging wheels positioned to the rear of the deck, an elevator rotatably connected to the jeep for rotation about a horizontally extending axis, a load supporting pivotal connection between the elevator and the rear gooseneck, an actuator operatively connected to the elevator for rotating the elevator about the horizontally extending axis to raise and lower the rear gooseneck and the rear of the deck, and interlocking teeth on the elevator and on a latch arm which is movable relative to the elevator for bringing the teeth on the arm into and out of engagement with the teeth on the elevator for locking the elevator in different rotational positions to maintain the deck at different heights above ground, wherein the teeth on the elevator extend along an arcuate path centered about the axis of the pivotal connection between the elevator and the rear gooseneck.

10. The trailer of claim 9 wherein the latch arm is pivotally mounted on the rear gooseneck for bringing the teeth on the latch arm into and out of engagement with the teeth on the elevator.

11. The trailer of claim 9 wherein the elevator comprises a pair of lift plates spaced laterally apart and connected together for movement in concert about the horizontally extending axis, with the teeth on the elevator extending along arcuately curved edges of the lift plates and latch arms with teeth engagable with the teeth on both of the lift plates.

12. The trailer of claim 11 wherein the lift plates are connected to the rear gooseneck by a pair of axially aligned pivot pins and the arcuately curved edges of the lift plates are centered about the axis of the pivot pins.

13. The trailer of claim 9 further comprising a booster with ground engaging wheels positioned behind and pivotally connected to the rear jeep in load supportive relationship for rotation about a vertical axis, steering means connected between the rear jeep and the booster for turning the booster about the vertical axis to steer the rear of the trailer.

14. The trailer of claim 13 wherein the connection between the elevator and the rear jeep can be shifted forwardly and rearwardly of the jeep to adjust the distribution of the load between the rear jeep and the booster.

15. The trailer of claim 9 including means connected between front end portions of the rear gooseneck and the rear jeep for keeping the front end portion of the gooseneck centered laterally of the jeep as the gooseneck is raised and lowered.

16. The trailer of claim 15 wherein the means for keeping the front end portion of the gooseneck centered comprises a crank mounted on the jeep for rotation about a longitudinally extending axis, and control arms pivotally connected between opposite ends of the crank and the gooseneck.

17. A heavy equipment trailer, comprising: an elongated deck, a front gooseneck extending from the front of the deck for connection to a pulling vehicle, a rear gooseneck extending from the rear of the deck, a jeep with ground engaging wheels positioned to the rear of the deck, a lift plate rotatably connected to the jeep for rotation about a horizontally extending axis, a load supporting pivotal connection between the lift plate and the rear gooseneck, an actuator operatively connected to the lift plate for rotating the lift plate about the horizontally extending axis to raise and lower the rear gooseneck and the rear of the deck, latch teeth extending along an arcuately curved edge of the lift plate, and a pivotally mounted latch arm with teeth that can be brought into and out of locking engagement with the teeth on the lift plate for locking the lift plate in different rotational positions to maintain the deck at different heights above ground.

18. The trailer of claim 17 wherein the arcuately curved edge of the lift plate is centered about the axis of the pivotal connection between the lift plate and the rear gooseneck.

19. The trailer of claim 17 wherein the latch arm is pivotally mounted on the rear gooseneck.

20. The trailer of claim 17 including means connected between front end portions of the rear gooseneck and the rear jeep for keeping the front end portion of the gooseneck centered laterally of the jeep as the gooseneck is raised and lowered.

21. The trailer of claim 20 wherein the means for keeping the front end portion of the gooseneck centered comprises a crank mounted on the jeep for rotation about a longitudinally extending axis, and control arms pivotally connected between opposite ends of the crank and the gooseneck.

* * * * *